(12) United States Patent
Adams

(10) Patent No.: US 6,836,798 B1
(45) Date of Patent: Dec. 28, 2004

(54) NETWORK MODEL RECONCILIATION USING STATE ANALYSIS

(75) Inventor: Mark Adams, Overland Park, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 199 days.

(21) Appl. No.: 10/335,321

(22) Filed: Dec. 31, 2002

(51) Int. Cl.[7] .................................... G06F 15/173
(52) U.S. Cl. ............................. 709/223; 370/254
(58) Field of Search ........................ 709/223, 224; 370/242, 252, 254

(56) References Cited

U.S. PATENT DOCUMENTS

| | | | | |
|---|---|---|---|---|
| 5,761,502 A | * | 6/1998 | Jacobs .................... | 707/103 R |
| 5,821,937 A | * | 10/1998 | Tonelli et al. ............ | 345/853 |
| 6,058,426 A | * | 5/2000 | Godwin et al. ........... | 709/229 |
| 6,170,011 B1 | * | 1/2001 | Macleod Beck et al. ... | 709/224 |
| 6,223,219 B1 | * | 4/2001 | Uniacke et al. ........... | 709/223 |
| 6,263,314 B1 | * | 7/2001 | Donner ..................... | 705/1 |
| 6,347,374 B1 | * | 2/2002 | Drake et al. .............. | 713/200 |
| 6,381,250 B1 | * | 4/2002 | Jacobson et al. .......... | 370/468 |
| 6,385,609 B1 | * | 5/2002 | Barshefsky et al. ......... | 707/6 |
| 6,385,652 B1 | * | 5/2002 | Brown et al. .............. | 709/227 |
| 6,401,120 B1 | * | 6/2002 | Gamache et al. .......... | 709/226 |
| 6,457,050 B1 | * | 9/2002 | Cowan et al. ............. | 709/224 |
| 6,470,388 B1 | * | 10/2002 | Niemi et al. .............. | 709/224 |
| 6,530,024 B1 | * | 3/2003 | Proctor ..................... | 713/201 |
| 6,775,701 B1 | * | 8/2004 | Pan et al. .................. | 709/226 |
| 2002/0010767 A1 | * | 1/2002 | Farrow et al. ............. | 709/223 |
| 2002/0013702 A1 | * | 1/2002 | Lee et al. .................. | 704/234 |
| 2002/0116485 A1 | * | 8/2002 | Black et al. ............... | 709/223 |
| 2002/0147801 A1 | * | 10/2002 | Gullotta et al. ............ | 709/223 |
| 2003/0005331 A1 | * | 1/2003 | Williams ................... | 713/201 |
| 2004/0003078 A1 | * | 1/2004 | Todd et al. ................ | 709/224 |
| 2004/0098474 A1 | * | 5/2004 | Galou et al. ............... | 709/223 |
| 2004/0107277 A1 | * | 6/2004 | Levesque et al. .......... | 709/223 |
| 2004/0122926 A1 | * | 6/2004 | Moore et al. .............. | 709/223 |

OTHER PUBLICATIONS

Grillo et al., "Teletraffic engineering for Mobile Personal communications in ITU–T work: The Need to Match Practice and Theory", IEEE1998, pp. 38–58.*
Glitho, "Isolating Faulty Routing Table isn SS7 Networks: Present and Future", IEEE 1996, pp. 98–104.*
Cohn, "Auditing Control Performance of Interconnected Areas Utilizing the Component Concept and Its Decomposition and Evaluation Techniques, Part I: Audit Technology and field Test.", IEEE 1998, pp. 581–587.*
Isarel et al., "Configuration Management of LargeIP Telephony Networks" IEEE, 2000, pp. 435–446.*
Lee et al., "Information–Theoretic Measures for Anomaly Detection", IEEE, 2001, pp. 130–143.*

(List continued on next page.)

Primary Examiner—Bunjob Jaroenchonwanit

(57) ABSTRACT

A method for reconciliation of a network with a network model that includes identifying an audit state for each network resource included in the network model, storing the audit state for each resource, coupling the stored audit state information with information regarding the resource, determining a calculated value reflecting the aggregate audit states of the resources, and running a series of reconciliation processes of increasing intrusiveness until the calculated value meets a defined threshold. The calculated value can be a best-case aggregate accuracy percentage, worst-case aggregate accuracy percentage, or presumed average aggregate accuracy percentage. The audit state can be stored as an additional field in the primary data store for the network model or in a separate data store that is associated with the primary data store. The audit state can be unconfirmed, confirmed, or suspect. The audit state is used to manage the intrusiveness of the reconciliation processes.

20 Claims, 1 Drawing Sheet

OTHER PUBLICATIONS

U.S. patent application Ser. No. 10/400,112; Mark Adams; *Filtering Approach for Network System Alarms*;; Filed Mar. 26, 2003; Specification 27 pages (including title page) and 1 drawing page.

U.S. patent application Ser. No. 10/335,466; Mark Adams; *Network Model Audit and Reconciliation Using State Analysis*; filed Dec. 31, 2002; Specification 33 pages (including title page) and 1 drawing page.

U.S. patent application Ser. No. 10/242,626; Mark Adams; *Orphaned Network Resource Recovery Throught Targated Audit and Reconciliation*; filed Apr. 28, 2003; Specification 32 pages (including title page) and 1 drawing page.

* cited by examiner

NETWORK MODEL RECONCILIATION USING STATE ANALYSIS

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the auditing of the configuration of elements in a network. More particularly, embodiments of the present invention provide a method for improving a reconciliation process to improve the accuracy of models of interconnected network elements using audit states.

BACKGROUND OF THE INVENTION

Elements in computer and telecommunications networks are sometimes interconnected in highly complex configurations. To aid in the management of such networks, models are sometimes created that are intended to list all elements in a network and record the ways in which they are interconnected. As used herein, the term element refers to a large-scale physical device such as a switch or a router. The word component refers to a physical or logical part of an element such as a circuit card within a switch. The term resource is used generically to refer to an element, a component, a physical port within an element, a logical decomposition within a port such as a wavelength assignable within an optical port, or any unit within a network that can provide information about itself. A list of resources in use and/or available for use in a network can be referred to as an inventory. A description of the ways resources are configured, such as their assigned usage, the other resources to which they are connected, and their relationships to other resources, can be referred to as a topology. Collectively, an inventory and its associated topology constitute a network model. Changes can occur over time in both an actual network and in a network model representing that network. Ideally, every change in the actual network is matched by an equivalent, corresponding change in the network model. However, discrepancies can occur that cause a network model to no longer accurately depict the network it is intended to describe. This can decrease the effectiveness of the network model in managing the network.

The sources of such a misalignment between a network model and an actual network can be placed into two categories, process, or human-related, gaps and system gaps. Process gaps can include a failure to properly record the installation or removal of an element, failure to properly record changes to an element, failure to properly record changes to the links interconnecting network elements, failure to record or restore emergency network repairs, human errors and deviations from defined operational processes, operational process deficiencies in the handoff of work between administrative units, operational process deficiencies in handling exceptional conditions, and intentionally deceptive use of network resources. System gaps can include a lack of automated coordination between interdependent models, deficiencies in exchanging information among interdependent models, software defects that corrupt or fail to properly update data records, and system failures that corrupt data records.

Auditing of network elements can be done to discover possible misalignments between a network model and an actual network. For the purposes of this disclosure, the comprehensive audit and reconciliation approach is defined as having three portions. The auditing process can be defined as the collection of information about the actual status and configuration of network elements and components at a particular moment in time. The comparison process can be defined as the comparison of this actual information to the network model and the documentation of discrepancies between them. The reconciliation process can be defined as the resolution and corresponding elimination of the documented discrepancies between the actual information about the network and the network model.

Traditionally, auditing has been done by periodically querying network elements. Each element thought to be present on a network can be periodically checked by the sending of one or more verifying queries to the element. The queries are intended to invoke replies back from the element providing descriptive information to the originator so that a comparison can be made between the network model and the element's interpreted responses. At a minimum, a response confirms the existence of an element. The content of a response can provide additional detail that can confirm or challenge specific details within a network model. A lack of a response raises a caution. For example, an audit system can use a mechanism such as the Internet Protocol "ping" command as an existence checking function. However, evidence that an element exists at a particular network address does not necessarily provide information regarding what type of element it is, how it is structured, what type of interface it supports, or how its interfaces are configured. In other query techniques, various standard protocols can be used to determine how an element responds. These additional responses received from the element can provide evidence of its identity, structure, and status. Based on the responses received, additional queries may be sent to the element to retrieve more information.

Information obtained from querying a network element can be compared to a network model. An element whose identify, structure, or status in the actual network differs from its identify, structure, or status in the network model can be referred to as a disputed resource. When an audit indicates that a disputed resource exists, the discrepancy has traditionally been recorded and reported for later resolution. Traditional resolution techniques have relied primarily on precedence rules ascribing a higher importance to either the actual network configuration (in which case, the network model is changed to match the network) or to the network model (in which case, the network itself is changed to match the network model).

In the normal course of operating a network, many different types of information about the configuration of elements of the network are created and distributed. Existing approaches to validating the accuracy of a network model do not make use of all available information types and methods of audit and reconciliation. The traditional audit and reconciliation technique is episodic and does not easily support a continuous audit and reconciliation process. Since an audit state model is not integrated with current inventory and topology models, the analysis of trends in the accuracy of a network model is not easily accomplished.

SUMMARY OF THE INVENTION

An embodiment of the invention is a method for auditing and reconciliation of a network with a network model. The method includes identifying an audit state for each resource of the network which is included in the network model. In the most preferred embodiment, the audit state can be an unconfirmed state, a confirmed state, or a suspect state. The audit state for each resource is stored and the stored audit state information is coupled with information regarding the resource associated with the network model. In various embodiments, this coupling may occur by storing the audit state information as additional fields in the primary data store for the network model or by storing the audit state information in a separate data store that is associated with the primary data store for the network model. A calculated value may be determined reflecting the aggregate audit states of all of the resources within an identified portion of the network model. The calculated value can be the best-case aggregate accuracy percentage, the worst-case aggregate accuracy percentage, or the presumed average aggregate accuracy percentage of the identified portion of the network model. The identified portion of the network model can comprise the entire network model.

In one embodiment, a reconciliation process can be started in the identified portion of the network model. A first comparison process can be started in which the results of the first reconciliation process are compared with the network model, the proper audit state for every compared resource is identified, and the stored audit state is modified for every resource whose proper audit state is different than the stored audit state. When the comparison process using the results of the first reconciliation process is complete, if the calculated value is below a defined threshold a second reconciliation process can be started. A second comparison process can be started in which the results of the second reconciliation process are compared with the network model, the proper audit state for every compared resource is identified, and the stored audit state is modified for every resource whose proper audit state is different than the stored audit state. The second reconciliation process can be more intrusive than the first. After the second comparison process, a third reconciliation process can be started if the calculated value after completion of the comparison process using the results of the first reconciliation process is below a defined threshold. A third comparison process can be started in which the results of the second reconciliation process are compared with the network model, the proper audit state for every compared resource is identified, and the stored audit state is modified for every resource whose proper audit state is different than the stored audit state. The second reconciliation process can be more intrusive than the first and the third can be more intrusive than the second. After the third comparison process, additional reconciliation processes with increasing intrusiveness and subsequent comparison processes can continue to be started until the calculated value after completion of the last comparison process meets a defined threshold.

In preferred embodiments, the subsequent reconciliation methods become increasingly more intrusive. In the basic sense, a first reconciliation process can be fully automated and a second reconciliation process can be not a fully automated process or can require manual supervision and guidance from somewhere in the network. In a more detailed preferred hierarchy, the following reconciliation processes are sequenced from less intrusive to more intrusive: a fully automated process that does not eliminate the availability of the audited systems or degrade the performance of the systems; a fully automated process that may not eliminate the availability of the audited systems but may degrade the performance of the systems; a fully automated process that may restrict the availability of portions of the audited systems during the time each system is being audited; a fully automated process that eliminates the availability of each of the audited systems during the time each system is being audited. In a further increase in intrusiveness, fully automated processes are considered less intrusive than processes which may require manual supervision and guidance from somewhere in the network. Manual supervision and guidance becomes even more intrusive when it is required that there be manual supervision and guidance from the site of the audited system. Many combinations of these processes may be selected for the first and second and/or first, second, and third processes, with the preference being that the less intrusive processes are tried before the more intrusive processes. Further, where the claims discuss the first and second process (or first, second, and third process) these only reflect their relative sequence to one another, and may not reflect the absolute sequence in an overall reconciliation effort (i.e. there may be reconciliation processes run prior to the "first" process or after the "second" or "third" process).

In an alternative embodiment, the improvement in the calculated value may be considered in place of the absolute calculated value to provide a threshold for continuing more intrusive reconciliation or stopping the reconciliation process. In such an embodiment, the calculated value after completion of the first comparison process can be compared to the calculated value before the start of the first comparison process. If the improvement in the calculated value after completion of the comparison process is below a defined threshold, a second reconciliation process can be started. A second comparison process can be started in which the results of the second reconciliation process are compared with the network model, the proper audit state for every compared resource is identified, and the stored audit state is modified for every resource whose proper audit state is different than the stored audit state. This may be further modified by adding the additional actions of continuing to start additional reconciliation processes with increasing intrusiveness and subsequent comparison processes until the improvement in the calculated value after completion of the latest comparison process, as compared with the calculated value before starting the first comparison process, meets a defined threshold. In this embodiment the improvement is being monitored from before the present overall reconciliation had commenced. In a final embodiment, the improvement may be measured between subsequent steps in the overall reconciliation (e.g. the calculated value after completion of the second comparison process can be compared to the calculated value before the start of the second comparison process, and so on).

DETAILED DESCRIPTION OF THE PREFERRED EMBODIMENTS

Figure 1:
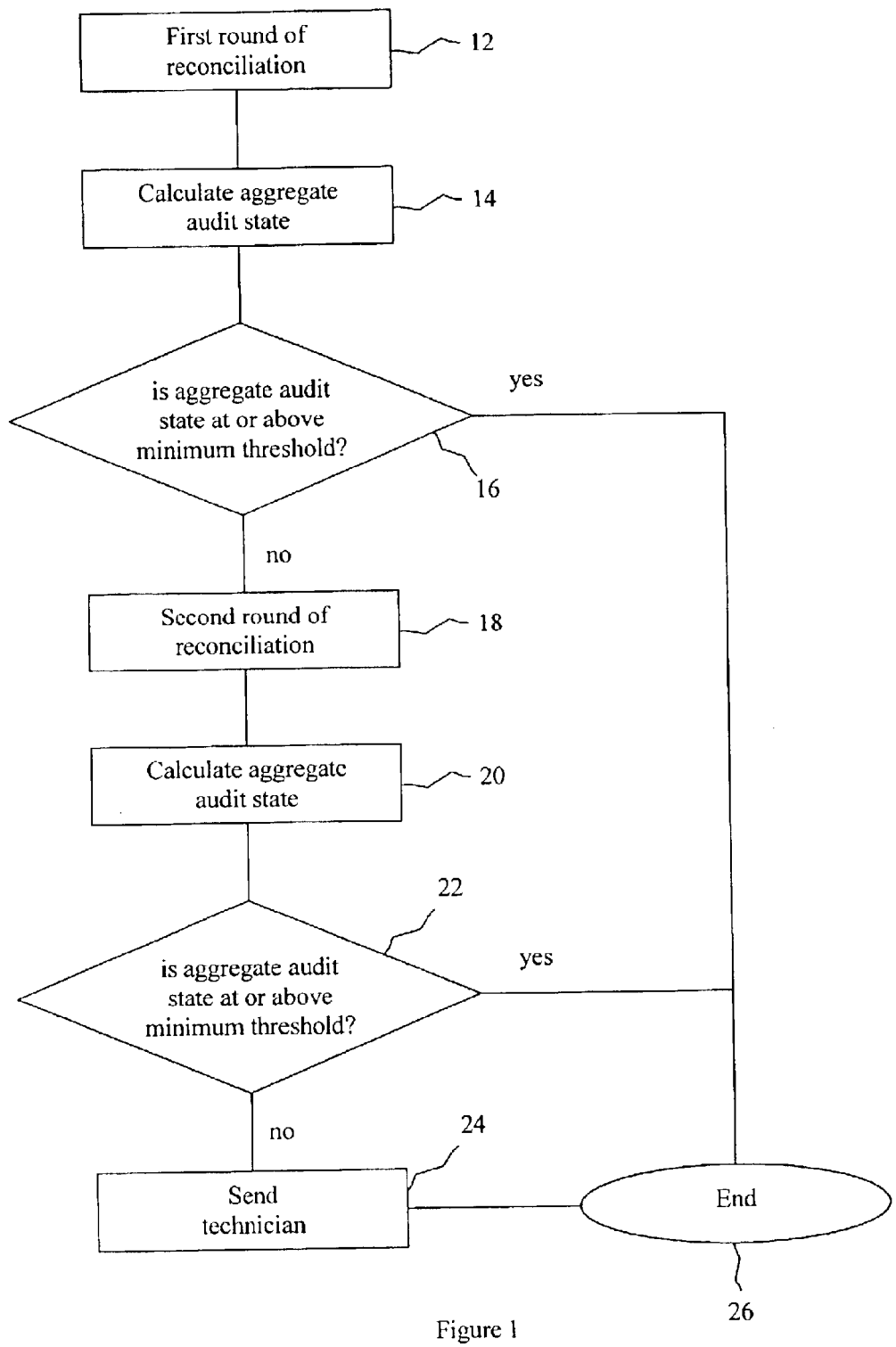
FIG. 1 is a block diagram depicting an embodiment of the audit and reconciliation process.

The present invention uses a set of defined "audit" states to improve the auditing process and the management of inventory and topology and to facilitate the reconciliation of discrepancies between a network model and an actual network. The use of these audit states can aid in pinpointing sources and causes of specific network changes, troubleshooting configuration problems, recovering lost network resources, identifying and correcting gaps in operational processes, improving data accuracy within network models, restoring corrupted or sabotaged network services, identifying covert network resource uses, speeding service delivery through improved automation, reducing service delivery rework, accelerating problem repair, and reducing the overall number of service problems.

The alignment or misalignment of a network model with the network it is intended to depict can be discovered through the comparison process described above based on one of several audit methods. First, a command and control process can be used wherein an element is given specific instructions to change its configuration or reallocate its resources. The element can then return to the originator of the configuration command either synchronous or asynchronous confirmation of the success or failure of the command. This configuration command response can provide information to an audit system about the element's status, either directly or through implication. In the case of a successful receipt of a configuration command response, the originator of the command can forward the confirmation information contained in the response to the audit system. In the case of configuration command failure, the element or a mediator should attempt to determine the cause of the failure and forward the relevant information to the audit system.

Several specific scenarios must be accounted for in the case of configuration command failure. In cases where no response is received from an element, the existence of that element is challenged but no final conclusions can be drawn as other factors such as temporary loss of network connectivity could account for the failure. However, the element should be placed on a watch list for more frequent reachability testing until connectivity is restored or more definitive evidence is received. Additionally, a response from an element indicating that a requested component within an element is unknown should be treated as evidence that the component is suspect. Finally, a response from an element that indicates a requested resource is already allocated to some other use should be treated as evidence that the resource is suspect. Additional investigative queries should be made to such an element to determine any other resources that are attached to the initial suspect resource. This can result in uncovering other resources that also need to be marked as suspect. Existing auditing methods that are not directly integrated with element command and control fail to collect this information at the point of failure. This delay in the identification of the problem until a later time when a periodic bulk auditing process can be run increases the difficulty of tracing the root cause of the discrepancy.

In a second audit method, audit information can be gathered through what can be referred to as auxiliary pathways. That is, messages that are being transmitted for other purposes can be captured and used by an audit system. For example, some elements periodically announce their presence and/or status via broadcast messages in a process that can be referred to as element self-announcement. An audit system can listen for these self-announcement messages and use them as the basis for verifying the appropriate resources in a network model. The audit system may also use these messages to trigger additional queries to the reporting element if the broadcast messages do not contain sufficient information to make a valid comparison between the actual network and the model.

Third, some protocols support broadcast-based discovery queries that ask all elements adhering to the protocol standards to report their presence and identity. The responses to these test messages can provide audit information. The use of this type of discovery query may also be referred to as stimulating resource messages which may then be reviewed and interpreted in an audit and reconciliation process. Subsequent queries to specific elements can be performed by an audit system to gain further information. These queries may also be considered efforts to stimulate resource messages, as can any situation where instead of merely passively monitoring for resource messages, an affirmative action is taken to get the resource to send out a resource message which may be analyzed in the audit and reconciliation process.

Fourth, some elements send change messages via the same channels used to report equipment problems, usually only to a specific list of registered locations or listeners. By registering for, listening for, and capturing these messages, an audit system can identify resources that are attached to the network at a particular point in time and can identify specific changes in resource configuration. The identified resources can be checked against the network model to determine if any discrepancies exist between the resources and states recorded in the model and the resources and states identified by the element's unsolicited report.

Fifth, some elements contain internal logs that document changes to an element and its internal components such as configuration changes, periodic performance metrics, alarm records, and security violations. The logs can also identify the person, group, or system that issued a change command and can record the date and time of the change. An audit system can capture and retain these logs and compare the actual resource information against the network model. This can aid in identifying resource changes that have not been recorded in the network model and in analyzing and remediating deficiencies in the audit system.

Sixth, certain network technologies and protocols transmit data about the source, destination, or intermediate points of communications. An audit system can use this information to check the existence of network resources. This information can also validate the reachability relationships between pairs of network resources. Packet protocols generally represent some portion of source and destination addresses within packet headers. Depending on the technology, these may be end-to-end or hop-to-hop. Flow monitors or probes, often included in networks to support testing and troubleshooting, are devices or software that can decompose individual packets and expose the parameters for examination. Captured address parameters can be used by the audit system to check resource and service records against actual network activity. Missing resources and services may be located as a result. Existing resources and services can be confirmed. Additionally, some topology data can be derived or deduced using this information.

Seventh, technologies that employ routing protocols generally provide sharing of network resource knowledge between elements. Examples include IP routing protocols like Routing Information Protocol, Border Gateway Protocol, ATM Private Network-to-Network Interface, and emerging Optical Transport Network protocols. Elements supporting these protocols contain some range of actual network information gained during normal operations. An audit system can collect this information and compare it against network records. Proper use of this information requires detailed understanding of each protocol and its peculiarities. Additional validation may be required before accepting the information as factual.

Eighth, certain network technologies and protocols support regular exchange of topological information between elements or with a central registry. These records can be used by an audit system to verify topological connections.

Ninth, certain network technologies and protocols provide support for tracing or connectivity validation methods. An audit system can use the data returned from these tools, either invoked specifically to support auditing by stimulation or during the course of normal network operations. These can be leveraged either as targeted queries aimed at specific resources or as broad systematic sweeps of address ranges, executed systematically. Address space sweeps require significant controls to prevent discovery beyond appropriate domains of responsibility.

Tenth, testing processes can produce validations of certain topology states. For example, it is possible to put a circuit into a loop-back condition at one end of a connection and have a signal generator at the opposite end send a pattern of digits through the connection. The digits are looped back and returned to the signal generator as though they were generated on the other end. The signal generator can listen for the digits and compare them to what was sent to make sure no changes occurred during transmission. In this way it is possible to confirm that two points are connected to each other. No information about intermediary connections is necessarily obtained, but this technique at least confirms that the two endpoints are connected, if indirectly. Recursively applying this approach to successive pairs of points within the path of a service can be used to systematically validate its topology. This is a regular testing procedure used during service delivery, troubleshooting, and maintenance and repair activities. The results of the testing can be provided to an audit system, which can then leverage the results systematically.

Eleventh, for some types of packet services, an alternate method of verifying logical linkage can be derived from roughly synchronized collection of data at adjacent or synchronized points. When a proper connection exists between two resources, traffic counts at the two points are approximately the same (within expected variances for measurement time variations and in-flight data volumes). In its simplest form, this method can only be used as circumstantial evidence to confirm connections (i.e., the traffic volumes match). It is less useful for disproving connections, as all reasonable accounting of loss must be measured (i.e., congestion, dropped cells along the way, buffer overflows, internal errors, etc.).

Twelfth, certain transmission protocols specify that key errors be propagated by resources along network paths. This increases the likelihood of media or equipment breakage being noticed, even if one or more of the resources closest to the problem is unable to respond or is unmonitored. This also allows breakage information to automatically flow across administrative domains. Resources and services as recorded in system models may be reporting alarms in the network that imply disabled or impaired service, yet the actual service may be measured or reported as unaffected. This inconsistency could indicate discrepancies between the model and the actual network. An audit system can draw conclusions about topology based on the presence or absence of propagated alarms.

Thirteenth, when other audit methods have been exhausted, a resource and its physical connections can be manually inspected. Manual methods include the visual inspection of devices, observation of indicator lights on an element's control panel, physically tracing the wire connections from one element to another, or measuring the signals between two elements using a test set inserted between two devices or at an external test access point. This manually obtained information can be input into the audit system through an appropriate user interface designed for that purpose.

An audit state can be defined as an information attribute that objectively describes the level of confidence held in the accuracy of the representation of a particular resource or relationship within a network model. An audit state can be associated with each individually assignable component within a network element and with each relationship linking assignable components.

In an embodiment of the invention, three audit states are defined: unconfirmed, confirmed, and suspect. The unconfirmed state indicates uncertainty about the accuracy of a network model representation of a resource or relationship. The unconfirmed audit state value implies that the configuration of a resource recorded in a network model is either unknown or is known to have changed by some explicit process, yet no confirming or contradicting evidence has been received from any of the previously described auditing processes. The unconfirmed state is also the initial or default state for all elements in a network model, until some evidence is received. As such, an audit state of unconfirmed does not necessarily imply that an element's status in the network model does not match the actual network configuration. The confirmed state indicates that some confirming evidence has been received from the network that verifies the accuracy of a network model representation of a resource or relationship. The suspect state indicates that some contradictory evidence has been received from the network that challenges the accuracy of a network model representation of a resource or relationship.

Two types of processes can be used to establish or change the audit state of a resource. First, any process that explicitly changes the assignment or configuration of a network resource changes the audit state of the resource to unconfirmed. This implies that a change is intended but has not yet been validated or challenged by supporting or contradicting evidence collected by one of the audit processes previously described. This first type of process includes all processes for designing, allocating, and activating resources. Second, the basic comparison process, triggered by any combination of the audit methods previously described, can set the audit state of a particular resource to either confirmed or suspect. Regardless of the current audit state of a resource, if evidence from an audit illustrates the correctness of the network model, the audit state of the appropriate resource is set to confirmed. Regardless of the current audit state, if evidence from an audit illustrates the incorrectness of the network model, the audit state of the appropriate resource is set to suspect. When integrated with these processes, audit states allow auditing to be an ongoing process rather than a one-time event and allow an analysis of trends of how well the model corresponds to the network.

Rules can govern the movement from one audit state to another based on a comparison of the network model with the results of an audit. A resource moves to the unconfirmed state when any change occurs in the network model. Whenever the configuration of a resource in the network model changes or is unknown, the unconfirmed state is set. Thus, the unconfirmed state is the default audit state. When a new network model is created or an existing network model is initially brought under the management of the audit state model, the entire network model is marked as unconfirmed. Thereafter, the audit methods monitor the network for information to determine its actual status. A resource moves to the confirmed state when and if evidence from an audit method validates the existence and configuration of the resource in the network model. A resource moves to the suspect state when and if evidence from an audit indicates that the actual configuration of the resource differs from its representation in the network model. In a preferred embodiment, at each change of state, the source of the evidence used to determine the audit state is also recorded, as well as the date and time that the evidence implies the audit state was valid. For each resource, a history of state changes including past values, dates, times, and sources can be kept. This information can be valuable for certain methods of reconciliation and analysis.

Movement between states occurs based solely on the results of an audit or as the result of known changes to the network model or the actual network. The current audit state of an element is not a factor in determining when a state change occurs. However, the current audit state is a factor in analyzing potential process problems and in analyzing the root cause of discrepancies. For example, if an audit method erroneously reports that the actual network does not match the model network, a model element could be incorrectly placed in the suspect state. If a subsequent audit indicates that the actual and model networks do in fact agree, the element would move back from the suspect to the confirmed state.

In an embodiment of the invention, the network model's inventory and topology data is linked to the audit states of the resources in the model. When a resource's status in the model changes or an element is added to the model, the appropriate changes are automatically made to the resource's audit state. In one embodiment, the audit methods can determine the status of a resource, compare it to the relevant inventory and topology in the model, and update the audit state appropriately. In another embodiment, all audit information is sent to an independent intermediary device. This device then compares the audit information to the network model and makes the appropriate changes to the model. Whenever a change occurs in a resource in the model, the status of any resources connected to the first resource could also change. Thus, the audit states of all elements connected to the first resource could change. In a preferred embodiment, all such resources are automatically placed in the unconfirmed state.

A resource's inventory and topology information and its audit states can be stored in a data storage medium such as a database. Topology and inventory information can be stored in one location with links to another location that stores the corresponding audit states. Alternatively, inventory and topology data and audit state can be fields in a common data store. The individual audit methods can each have access to the data store or an interface such as a database manager can be present through which the audit methods interact with the data store.

The audit states can be used to calculate how well the audit model matches the actual network. Because the unconfirmed state implies uncertainty, the aggregate accuracy of a network model can be represented as a range of possible values, depending on the assumption made about the accuracy of the unknown portion of the model. Three accuracy measures are useful: the best case, the worst case, and the average case. In the best case, all unknown model resources are assumed to be correct, resulting in the highest possible accuracy percentage. In the worst case, all unknown model resources are assumed to be incorrect, resulting in the lowest possible accuracy percentage. In the average case, the unknown resources are assumed to have an accuracy ratio similar to the ratio of the known resources, that is, the resources in either the confirmed or suspect states. The sum of the unconfirmed, confirmed, and suspect resources equals the total number of resources in the network. When the number of confirmed resources is divided by this total, the result is the worst-case accuracy percentage. When the sum of the confirmed and unconfirmed resources is divided by the total number of resources, the result is the best-case accuracy percentage. When the number of confirmed resources is divided by the sum of confirmed and suspect resources, the result is the average accuracy of the network model. These percentages can reflect the range of how accurately the network model represents the actual network. Changes in these percentages can indicate trends in the accuracy of the model and can be used to make business decisions regarding the cost-effectiveness of attempting to reconcile the network model with the actual network. Based on these percentages, decisions to invest in additional automation, process improvement, or field remediation can be made rationally. Below a certain accuracy percentage it might be worthwhile to send a technician into the field to correct a problem. Above a certain accuracy percentage automated systems can be allowed to handle reconciliation activities. Ideally, normal work processes can be established that naturally correct discrepancies incrementally as a standard practice. The tracking of overall accuracy serves as a key measure for the effectiveness of these activities. An embodiment of this invention includes regular analysis of the failures. Root cause analysis is easiest when discrepancies are recognized as soon as they occur, not many hours or days later where the context may be difficult or impossible to fully reconstruct. Accuracy rates and the frequencies of discrepancies can also be used to encourage individual and collective responsibility. The full range of network resources can be subdivided into specific pools or types to match the domain of responsibility for a particular organization. The same formulas apply, but the scope is limited to the appropriate resources.

The history of audit state changes can be used as one measure of the rate of network volatility, as a whole and for selected portions or resource types. Historical state changes can also be used to explain or troubleshoot individual service problems or network problems. Historical audit state changes can be matched against particular complaints known to have occurred at particular times. The frequency of selected audit methods may be adjusted based on the volatility observed for a resource, resource type, element, or element type. When volatility is higher, more frequent auditing may be justified.

Reconciliation can be defined as the analysis of the likely causes of discrepancies between a network model and the actual network, the determination of the actions required to correct the discrepancies, the execution of changes in the network and/or model to eliminate the discrepancies, and the adjustment of policies and procedures to prevent future discrepancies. More specifically, reconciliation can be viewed as an effort to realign the network model and the actual network. A reconciliation process may use any of the auditing or testing processes described above as tools to help make decisions on changing the model or the network to bring the two into closer alignment. As a byproduct of reconciliation, the audit state of affected resources should eventually change to confirmed from unconfirmed or suspect.

Several reconciliation analysis methods can be used. First, the resources that a disputed resource is linked to upstream and downstream or at higher and lower service levels can be investigated. Determination of the audit states of these other elements can often reveal the source of a discrepancy. A similar investigation can be performed for a disputed resource within a network model. Another reconciliation analysis method is the comparison of the sequence of actual changes to an element to the sequence of changes recorded in the network model. Noting the source, date, and time of all changes can show the point where the actual network and the network model diverged. As an additional reconciliation method, temporary changes such as those caused by intrusive testing, emergency procedures, and maintenance functions can be recorded so that the actual network can be restored to its original configuration or so that the network model can be modified if the changes become permanent.

An embodiment of the audit and reconciliation process after the decision to reconcile has been triggered is shown in FIG. 1. In box 12, a first round of reconciliation is performed. This typically includes non-intrusive actions with a small likelihood of creating negative ramifications. For example, when resources are newly installed, they are placed in the unconfirmed state by default. A simple audit could occur in box 12 that detects the status of such resources, verifies they are in the status recorded in the network model, and places them in the confirmed state. In box 14, the aggregate audit state of the network model is calculated. This can be a best-case, worst-case, or average aggregate audit state as deemed appropriate by an auditing administrator. In box 16, the calculated aggregate audit state is compared to a desired minimum level. If the aggregate audit state is at or above the threshold then the network model is considered to be in sufficient agreement with the actual network and the reconciliation process ends as shown in box 26. If the aggregate audit state is below the threshold then further reconciliation is needed. In this case, as shown in box 18, a second round of reconciliation would occur for resources in the unconfirmed or suspect state. This step might include more intrusive types of tests that could require coordination with entities that might be affected by any intrusive tests performed on the resources in question. Practically, this may require delaying intrusive activities until some defined maintenance period. After these reconciliation activities are complete, the aggregate audit state is again calculated as shown in box 20. In box 22, the newly calculated aggregate audit state is compared to the desired minimum. If the aggregate audit state is at or above the threshold then the reconciliation process ends as shown in box 26. If the aggregate audit state is below the threshold then, as shown in box 24, a technician may be sent into the field to perform manual tests on the disputed resources. Practically, the deployment of a technician might depend on the level of resource capacity available. If resource capacity is adequate for current needs, then field reconciliation may be deferred until a constraint develops or until other business needs force a field visit.

While only two rounds of reconciliation are shown in FIG. 1, in other embodiments further reconciliation activities could occur at various points in the illustrated process. For example, after box 16, other reconciliation activities could occur before what is shown as the second round of reconciliation in box 18. These might include processes in which a resource is asked to provide feedback on all of its internal parameters. This information could then be used to reconcile the resource's audit state. The aggregate audit state could be calculated at that point and if it is at or above the minimum the reconciliation process could end. If it is below the minimum then the reconciliation activities depicted in box 18 could be performed and the entire reconciliation process could continue as shown in FIG. 1. Also, other reconciliation activities could occur after box 22 before a technician is dispatched in box 24. These might include tests that definitely cause an interruption of service such as putting a resource in a loop-back condition. As described above, the aggregate audit state could be calculated after these tests are done and the reconciliation process could end if the aggregate audit state is at or above the minimum. If the aggregate audit state is below the minimum, a technician could be sent into the field as shown in box 24.

In summary, FIG. 1 is intended to depict a hierarchical process in which a minimally intrusive reconciliation activity is performed at the start. If this activity results in an acceptable aggregate audit state, no further reconciliation is needed. If the aggregate audit state is unacceptable after this first round of reconciliation, another round of reconciliation is performed in which more intrusive testing is done. This process of performing more and more intrusive automated testing and reconciliation continues until an acceptable aggregate audit state is reached. If an acceptable aggregate audit state cannot be achieved through automated testing and reconciliation, a technician can be sent into the field to perform field reconciliation.

In an embodiment of the invention, the hierarchy of reconciliation processes can begin with a fully automated process that does not eliminate the availability of the audited systems or degrade the performance of the systems. Performance degradation can refer to the reduction of bandwidth, efficiency, capacity, or throughput of the systems. The term "fully automated" can refer to a process in which human intervention may or may not be needed to begin the process but no further human intervention is needed thereafter. A next level in the reconciliation process hierarchy can be a fully automated process in which the availability of the audited systems is not eliminated but the performance of the systems is degraded. A next level can be a fully automated process in which the availability of portions of the audited systems is restricted during the time of an audit. A next level can be a fully automated process in which the availability of portions of the audited systems is eliminated during the time of an audit. A next level can be a manual process guided from somewhere in the network, where a manual process is a process in which human intervention may be required at multiple points. A next level can be a manual process guided from the site of the audited system.

After the completion of a reconciliation process, a comparison process can be triggered in which the results of the reconciliation process are compared with the network model, the proper audit state for every compared resource is identified, and the stored audit state is modified for every resource whose proper audit state is different from the stored audit state. The calculated value reflecting the aggregate audit states of the resources in an identified portion of the network model can continue to be monitored throughout this process. After completion of the comparison process using the results of the first reconciliation process, if the calculated value is below a defined threshold, a second reconciliation process can be triggered. Another comparison process can then be triggered in which the results of the second reconciliation process are compared with the network model, the proper audit state for every compared resource is identified, and the stored audit state is modified for every resource whose proper audit state is different from the stored audit state. In an embodiment, the first reconciliation process is a fully automated process and the second reconciliation process is not a fully automated process. The second reconciliation process can be more intrusive and/or expensive than the first reconciliation process.

The information returned by an audit or reconciliation process about the status of a network resource can be referred to as a resource message. A resource message can be automatically returned from one or more network resources by an ongoing, automated audit or reconciliation process. It may not be possible to know in advance which resources will respond to such automated processes. Alternatively, a manual audit or reconciliation process can be directed toward an identified resource in order to obtain a resource message related to that resource. In an alternative embodiment the invention can be viewed as a method for monitoring these resource messages. An audit state for each network resource included in the network model is identified, stored, and coupled with information regarding the resource itself. When the monitored resource messages reflect a change in the network, the resources impacted by the change are compared with the corresponding resources in the network model. The audit state of each impacted resource is then changed from its stored audit state. A calculated value reflecting the aggregates audit states of all of the resources within the identified portion of the network model can then be reported.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein but may be modified within the scope of the appended claims along with their full scope of equivalents.

What is claimed is:

1. A method for managing reconciliation of a network with a network model comprising:
    identifying an audit state for each resource of the network which is included in the network model;
    storing the audit state for each resource and coupling the stored audit state information with information regarding the resource associated with the network model;
    determining a calculated value reflecting the aggregate audit states of all of the resources within an identified portion of the network model;
    starting at least one reconciliation process in the identified portion of the network model;
    starting a first comparison process wherein the comparison process comprises comparing the results of the first reconciliation process with the network model, identifying the proper audit state for every compared resource, and modifying the stored audit state for every resource whose proper audit state is different than the stored audit state;
    starting a second reconciliation process if the calculated value after completion of the comparison process using the results of the first reconciliation process is below a defined threshold;
    starting a second comparison process wherein the comparison process comprises comparing the results of the second reconciliation process with the network model, identifying the proper audit state for every compared resource, and modifying the stored audit state for every resource whose proper audit state is different than the stored audit state.

2. The method of claim 1, wherein the second reconciliation process is more intrusive than the first reconciliation process.

3. The method of claim 1, further comprising after the second comparison process:
    starting a third reconciliation process if the calculated value after completion of the comparison process using the results of the first reconciliation process is below a defined threshold;
    starting a third comparison process wherein the comparison process comprises comparing the results of the second reconciliation process with the network model, identifying the proper audit state for every compared resource, and modifying the stored audit state for every resource whose proper audit state is different than the stored audit state.

4. The method of claim 3, wherein the second reconciliation process is more intrusive than the first reconciliation process and wherein the third reconciliation process is more intrusive than the second reconciliation process.

5. The method of claim 3, further comprising after the third comparison process:
    continuing to start additional reconciliation processes with increasing intrusiveness and subsequent comparison processes until the calculated value after completion of the last comparison process meets a defined threshold.

6. The method of claim 2, wherein the first reconciliation process is a fully automated process and wherein the second reconciliation process is a process which requires manual supervision and guidance from somewhere in the network.

7. The method of claim 2, wherein the first reconciliation process is a fully automated process which does not eliminate availability of the audited systems or degrade the performance of the systems and wherein the second reconciliation process is a fully automated process which does not eliminate availability of the audited systems but may degrade the performance of the systems.

8. The method of claim 2, wherein the first reconciliation process is a fully automated process which does not eliminate availability of the audited systems but may degrade the performance of the systems and wherein the second reconciliation process is a fully automated process which restricts availability of portions of the audited systems during the time the each system is being audited.

9. The method of claim 2, wherein the first reconciliation process is a fully automated process which restricts availability of portions of the audited systems during the time the each system is being audited and wherein the second reconciliation process is a fully automated process which eliminates availability of each of the audited systems during the time each system is being audited.

10. The method of claim 2, wherein the first reconciliation process is a process which requires manual supervision and guidance from somewhere in the network and wherein the second reconciliation process is a process which requires manual supervision and guidance from the site of the audited system.

11. The method of claim 1 wherein the calculated value is the best-case aggregate accuracy percentage of the identified portion of the network model.

12. The method of claim 1 wherein the calculated value is the worst-case aggregate accuracy percentage of the identified portion of the network model.

13. The method of claim 1 wherein the calculated value is the presumed average aggregate accuracy percentage of the identified portion of the network model.

14. The method of claim 1 wherein the identified portion of the network model comprises the entire network model.

15. The method of claim 1, wherein the audit state is stored as an additional field in the primary data store for the network model.

16. The method of claim 1, wherein the audit state is stored in a separate data store that is associated with the primary data store for the network model.

17. The method of claim 1, wherein the audit state is selected from one of the group of an unconfirmed state, a confirmed state, and a suspect state.

18. The method of claim 2, wherein the first reconciliation process triggered is a fully automated process and the second reconciliation process triggered is not a fully automated process.

19. A method for managing reconciliation of a network with a network model comprising:
- identifying an audit state for each resource of the network which is included in the network model;
- storing the audit state for each resource and coupling the stored audit state information with information regarding the resource associated with the network model;
- determining a calculated value reflecting the aggregate audit states of all of the resources within an identified portion of the network model;
- starting at least one reconciliation process in the identified portion of the network model;
- starting a first comparison process wherein the comparison process comprises comparing the results of the first reconciliation process with the network model, identifying the proper audit state for every compared resource, and modifying the stored audit state for every resource whose proper audit state is different than the stored audit state;
- comparing the calculated value after completion of the first comparison process with the calculated value before starting the first comparison process;
- starting a second reconciliation process if the improvement in the calculated value after completion of the comparison process is below a defined threshold;
- starting a second comparison process wherein the comparison process comprises comparing the results of the second reconciliation process with the network model, identifying the proper audit state for every compared resource, and modifying the stored audit state for every resource whose proper audit state is different than the stored audit state.

20. A method for managing reconciliation of a network with a network model comprising:
- identifying an audit state for each resource of the network which is included in the network model;
- storing the audit state for each resource and coupling the stored audit state information with information regarding the resource associated with the network model;
- determining a calculated value reflecting the aggregate audit states of all of the resources within an identified portion of the network model;
- starting at least one reconciliation process in the identified portion of the network model;
- starting a first comparison process wherein the comparison process comprises comparing the results of the first reconciliation process with the network model, identifying the proper audit state for every compared resource, and modifying the stored audit state for every resource whose proper audit state is different than the stored audit state;
- comparing the calculated value after completion of the first comparison process with the calculated value before starting the first comparison process;
- starting a second reconciliation process if the improvement in the calculated value after completion of the comparison process is below a defined threshold;
- starting a second comparison process wherein the comparison process comprises comparing the results of the second reconciliation process with the network model, identifying the proper audit state for every compared resource, and modifying the stored audit state for every resource whose proper audit state is different than the stored audit state comparing the calculated value after completion of the second comparison process with the calculated value before starting the first comparison process;
- continuing to start additional reconciliation processes with increasing intrusiveness and subsequent comparison processes until the improvement in the calculated value after completion of the latest comparison process, as compared with the calculated value before starting the first comparison process, meets a defined threshold.

* * * * *